United States Patent [19]

Peck, Jr. et al.

[11] Patent Number: 4,719,353
[45] Date of Patent: Jan. 12, 1988

[54] INTEGRATED INFRARED DETECTOR AND CRYOENGINE ASSEMBLY

[75] Inventors: Leonard E. Peck, Jr., Goleta; Fred J. Neitzel, Santa Barbara; Wesson P. Sargent, Goleta; James P. McDonald, Solvang, all of Calif.

[73] Assignee: Santa Barbara Research Center, Goleta, Calif.

[21] Appl. No.: 771,948

[22] Filed: Sep. 3, 1985

[51] Int. Cl.[4] .............................. G01J 5/06
[52] U.S. Cl. .................... 250/352; 62/514 R
[58] Field of Search .............. 250/352, 370 L; 62/514 R

[56] References Cited

U.S. PATENT DOCUMENTS

| | | | |
|---|---|---|---|
| 3,055,191 | 9/1962 | Dennis | 250/352 |
| 3,356,846 | 12/1967 | Rupert et al. | 250/352 |
| 4,488,414 | 12/1984 | Jungkman et al. | 250/352 |
| 4,621,279 | 11/1986 | Maier et al. | 250/352 |

OTHER PUBLICATIONS

U.S. Serial No. 830,788.
U.S. Serial No. 933,507.
U.S. Serial No. 807,924.
U.S. Serial No. 806,895.
U.S. Serial No. 874,253.
U.S. Serial No. 9,153.

Primary Examiner—Carolyn E. Fields
Attorney, Agent, or Firm—Ronald L. Taylor; A. W. Karambelas

[57] ABSTRACT

An apparatus for mounting a device used for detecting infrared signals is disclosed. The apparatus includes a housing and an expander upon which the device is mounted. An insulating material comprising polymeric foam is disposed between the expander and the housing which allows the apparatus to be cooled without requiring evacuation of the apparatus.

14 Claims, 7 Drawing Figures

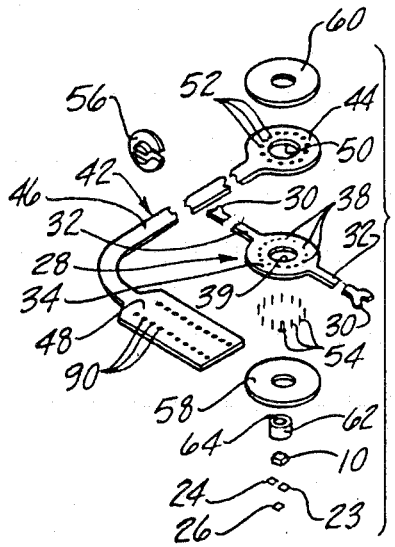
*Fig-1*
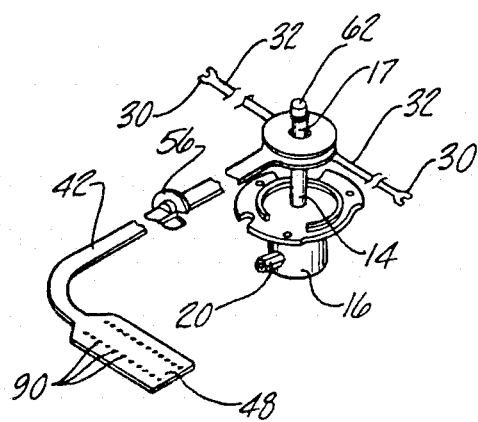
*Fig-2*
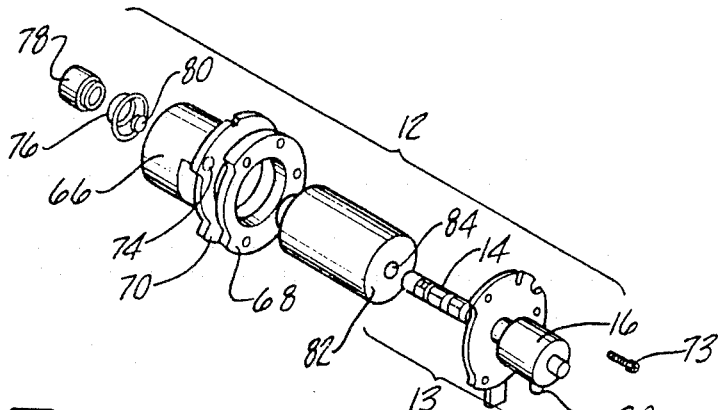
*Fig-3*
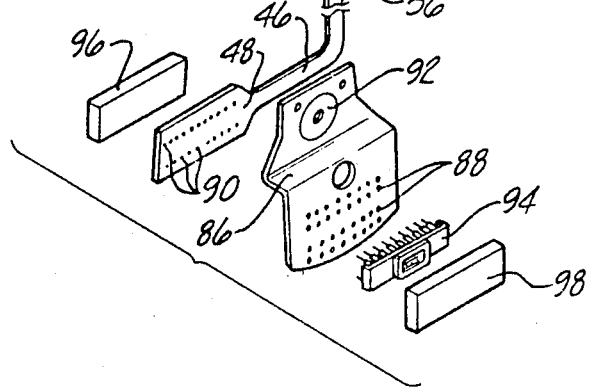

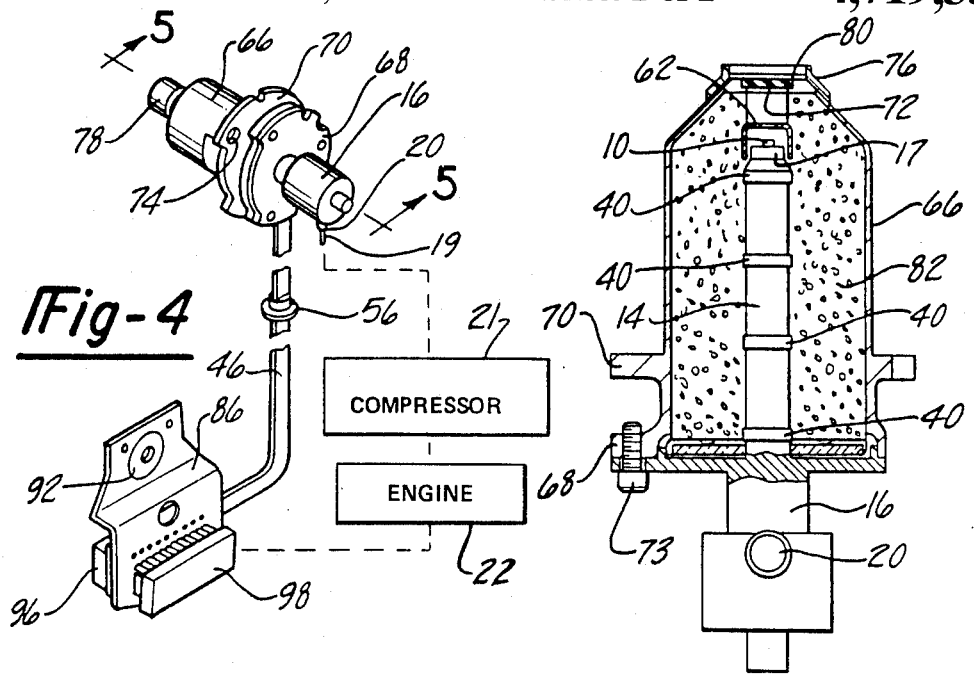
*Fig-4*
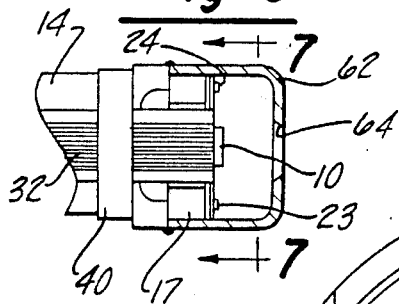
*Fig-5*
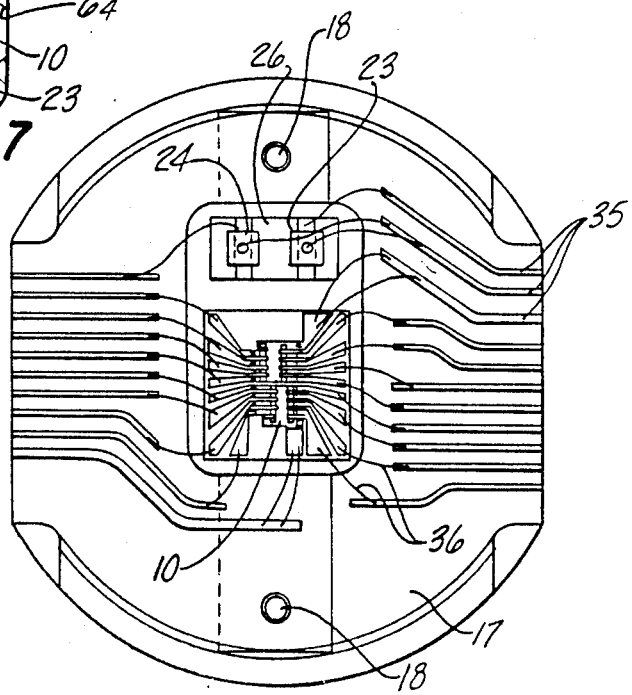
*Fig-6*
*Fig-7*

INTEGRATED INFRARED DETECTOR AND CRYOENGINE ASSEMBLY

BACKGROUND OF THE INVENTION

1. Field of the Invention

This invention relates to the field of infrared sensing, and more particularly, to an integrated infrared detector and cryoengine assembly which does not require evacuation for operation.

2. Description of Related Art

Infrared detectors are often used in conjunction with missiles and night vision systems to sense the presence of electromagnetic radiation having a wavelength of 1-15 μm. Because many of them are most sensitive when operating at approximately 77° K., infrared detectors fabricated from mercury-cadmium-telluride often require a cryoengine assembly to produce and maintain the required operating temperature. Such cryoengine assemblies are typically used in conjunction with an evacuated dewar in which the infrared detector is placed. The dewar is evacuated to remove gases which would otherwise occupy the region surrounding the detector so that potential heat loss through convection and conduction is minimized. The dewar is cooled by placing an indented region ("coldwell") of the dewar in contact with an expansion chamber ("coldfinger") of the cryoengine assembly which is supppplied with a cooling fluid such as helium. When used with a split cycle cryoengine, the coldfinger is referred to as an expander. To supply the expander with the cooling fluid, the cryoengine assembly includes a compressor which delivers the fluid to the expander by means of a transfer line. As the fluid expands in the expander, it absorbs thermal energy from both the expander and the dewar causing the detector to cool. Because the temperature of the expander is related to the amount of fluid delivered by the compressor, the temperature of the detector may be controlled by varying the compressor speed.

While the infrared detector assemblies described above are able to produce and maintain the temperature levels required for sensitive operation of the mercury-cadmium-telluride detectors, design constraints often limited material selection, fabrication methods, and closure techniques. To maintain the vacuum within the dewar, the materials from which the dewar was fabricated had to be relatively free from vacuum leakage and have low diffusivity with respect to environmental gases. The materials also had to be resistant to outgassing, in which environmental gases would be released from the materials while the dewar was being evacuated. After the appropriate selection of materials, the dewar had to be fabricated using techniques which did not reduce their diffusion resistant properties or produce vacuum leaks. Furthermore, implementing the necessary closure techniques required to ensure the vacuum inside the dewar would be maintained were often costly and generally required the use of vacuum pumps, leak detectors and residual gas analysis devices. In addition to design constraints, thermophonic and microphonic difficulties also were often present in the infrared detector assemblies described above.

SUMMARY OF THE INVENTION

It is therefore a primary purpose of the present invention to provide an infrared detector assembly which does not require evacuation for operation.

It is a further purpose of the present invention to provide an infrared detector assembly having an expander upon which an infrared detector can be directly mounted.

It is a further purpose of the present invention to provide an infrared detector assembly which is less costly to manufacture. In this regard, a related purpose of the present invention is to provide an infrared detector assembly in which the number of components is reduced.

Another purpose of the present invention is to provide an infrared detector assembly which may be assembled relatively easily. In this regard, a related purpose of the present invention is to provide an infrared detector which can be manufactured without requiring the assembly to be evacuated. A further related purpose of the present invention is to provide an infrared detector assembly in which the amount of testing and inspection during production can be reduced.

These and other objects of the present invention are accomplished by providing an apparatus for mounting a device for detecting infrared signals in which the apparatus comprises means for housing the device and means for supporting the device within the housing. Also provided is a means for insulating the device which is disposed between the housing means and the supporting means. The means for insulating is operable to allow the device to function without requiring evacuation of the apparatus.

DESCRIPTION OF THE DRAWINGS

Various advantages of the present invention will become apparent to one skilled in the art upon reading the following specification and by reference to the drawings in which:

FIG. 1 is an exploded perspective view of the harness assemblies and the detector array assembly of the present invention;

FIG. 2 is a perspective view of the expander assembly showing the orientation of the expander with respect to the coldshield and the harness assemblies;

FIG. 3 is an exploded perspective view of the expander assembly showing the orientation of the outer housing, insulator, lens cell, optics mount, window, and the components for interfacing the fatline harness assembly;

FIG. 4 is a perspective view of the assembled infrared detector assembly;

FIG. 5 is a cross-sectional view of the infrared detector assembly taken along line 5—5 of FIG. 4.

FIG. 6 is an enlarged cross-sectional view of the cold tip of the expander shown in FIG. 5; and FIG. 7 is an enlarged end view of the cold tip of the expander taken along line 7—7 of FIG. 6.

DESCRIPTION OF THE PREFERRED EMBODIMENT

With reference to the drawings, to receive signals from an infrared source, an infrared detector array 10 is provided which is located within an infrared detector assembly 12. The infrared detector array 10 may be fabricated from a layer of mercury-cadmium-telluride on a sapphire substrate material. Other types of infrared detectors which require cooling for proper operation may also be used. Non-limiting examples of such detectors include focal plane arrays fabricated from mercury-cadmium-telluride. To support the infrared detector array 10, an expander assembly 13 is provided having an expander 14 and a base portion 16. The infrared detector array 10 is centrally mounted on the cold tip 17 of the expander 14 and is secured thereto by means of an adhesive. To cool the detector array 10, the expander 14 receives cooling fluid from a cryoengine through a transfer line 19 and a connector 20. By expansion of the fluid inside the expander 14, thermal energy is drawn from the expander 14 thereby cooling the detector array 10. The cryoengine includes a compressor 21 which is connected to the engine 22, though it is to be understood that other suitable cryoengines may be used.

To monitor the temperature of the infrared detector array 10, two thermal sensors 23 and 24 are located adjacent to the detector array 10 on the cold tip 17 of the expander 14. Each of the thermal sensors 23 and 24 may be a 1N914 switching diode, though it is to be understood that other suitable temperature sensors which are sensitive to temperature variation in the requisite ranges may also be used. To mount the thermal sensors 23 and 24 on the cold tip 17 of the expander 14, a thermal sensor mount 26 is provided upon which the thermal sensors 23 and 24 are secured by means of conductive adhesive. The thermal sensor mount 26 may be fabricated from a ceramic, and is secured to the end of the expander by means of adhesive.

To conduct signals generated by the infrared detector array 10, the detector array 10 is connected to a fineline harness assembly 28 having end portions 30, leg portions 32 and a circular interface 34. The fineline harness assembly 28 comprises a flexible etched circuit cable having copper conductors disposed between layers of polymide based dielectric material attached by means of an acrylic adhesive. Each of the conductors in the fineline harness assembly 28 are located at a distance greater than 0.010 inch from the longitudinal edges of the assembly 28, and have a DC resistance not exceeding 0.50 ohms. To connect the end portions 30 of the fineline harness assembly 28 to the detector array 10, the ends 35 of the conductors at the end portions 30 are coated with a gold plate having a thickness of 50-100 microns. The ends 35 of the conductors are then connected to the terminals of the detector array 10 by gold lead wires 36 as can be seen in FIG. 7. To allow electrical interfacing of the fineline harness assembly 28, the circular interface 34 of the fineline harness assembly 28 has a plurality of solder pads 38 having a tin/lead plate. The solder pads 38 of the circular interface 34 are used to electrically communicate with a lead having terminals on the outside of the infrared detector assembly 12 as discussed subsequently. The circular interface 34 of the fineline harness assembly 28 also has a centrally located aperture 39 of sufficient diameter to accommodate the expander 14. To secure the leg portions 32 of the fineline harness assembly 28 to the expander 14, a plurality of cable retainers 40 are wrapped around the expander 14 and leg portions 32. The cable retainers 40 are composed of polymide, though it is to be understood that other suitable materials may be used.

To allow access to the signals generated by the infrared detector array 10 from outside the infrared detector assembly 12, a fatline harness assembly 42 is provided which has a circular interface 44, a leg portion 46, and a rectangular portion 48. The fatline harness assembly 42 comprises a flexible etched circuit cable having multilayered copper conductors which are disposed between two layers of a polymide based dielectrical material attached by means of an acrylic adhesive. The circular interface 44 of the fatline harness assembly 42 has a centrally located aperture 50 of sufficient diameter to accommodate the expander 14. To connect the circular interface 44 of the fatline harness assembly 42 to the circular interface 34 of the fineline harness assembly 28, the circular interface 44 has a plurality of solder pads 52 (FIG. 1) which are able to mate with the corresponding sodler pads 38 of the circular interface 34. To electrically couple the solder pads 52 on the circular interface 44 with the solder pads 38 on the circular interface 34, a plurality of ferrules 54 are disposed within the holes of the solder pads 52 and the solder pads 38. The ferrules 54 are secured to the solder pads 38 and 52 by mechanical deformation of one end of each of the ferrules 54 and subsequent soldering of each end of the ferrules 54. To ground radio frequency interference traveling on the exterior of the fatline harness assembly 42, a grommet 56 is secured to a portion of the fatline harness assembly 42 which is covered by a copper tape (not shown). The grommet 56 is attached to the electronics housing (not shown) containing the electronics for processing the signals from the detector array 10, and therefore grounds radio frequency interference propagating on the surface of the fatline harness assembly 42 prior to entry into the electronics housing. The grommet 56 may be fabricated from a brass alloy and subsequently plated with copper, though it is to be understood that other suitable materials may be used.

To electrically insulate the fatline and fineline harness assemblies 28 and 42 from the expander assembly 13, two insulating washers 58 and 60 are provided. The insulating washer 58 is located between the circular interface 34 and the base portion 16 of the expander assembly 13, and the insulating washer 60 is located on the surface of the circular interface 44 which is not adjacent to the circular interface 34. The insulating washers 58 and 60 may be fabricated from polymide film, though it is to be understood that other suitable materials may be used.

To maintain the temperature of the cold tip 17 of the expander 14 within the suitable operating temperature range, a coldshield 62 is centrally located over the cold tip 17 of the expander 14 and is attached thereto by an adhesive. The coldshield 62 includes an aperture 64 which provides an unobstructed path for infrared radiation from the environment to reach the detector array 10. While the coldshield 62 may be fabricated from stainless steel, it is to be understood that other suitable materials may be used.

To house the detector array 10 and expander 14, an outer housing 66 is provided which has two flange portions 68 and 70 and an aperture 72 through which infrared signals may be passed. The flange portion 68 is used to secure the base portion 16 of the expander assembly 13 to the outer housing 66 by the screws 73. The second flange portion 70 includes apertures 74 which enables the outer housing 66 to be mounted on a gyrooptics assembly (not shown). The outer housing 66 may be fabricated from 6061-T6 aluminum alloy, though it is to be understood that other suitable materials may be used.

To concentrate the incoming infrared signals on the detector array 10, a lens cell 78 interfacing with an optics mount 76 is mounted over the aperture 72 of the outer housing 66. The lens cell 78 is used to focus the incoming infrared signals on the detector array 10, and includes a lens fabricated from germanium and zinc sulfide to produce the desired color correction. To allow unobstructed passage of infrared radiation through the outer housing to the detector array, a window/bandpass filter 80 is mounted on the aperture 72 of the outer housing 66.

To thermally insulate the expander 14, an insulating material 82 is located between the expander 14 and the outer housing 66. The insulating material 82 generally conforms to the inside surface of the outer housing 66, and includes a cylindrical aperture 84 which allows the expander 14 to be inserted therethrough. By providing the insulating material 82 between the expander 14 and the outer housing 66, the temperature of the detector array 10 can be maintained without requiring evacuation of the region otherwise occupied by the insulating material 82. The insulating material 82 preferably takes the form of a sleeve of a polymeric foam such as expanded polystyrene.

To electrically interface the rectangular portion 48 of the fatline harness assembly 42, an etched circuit connector 86 (FIGS. 3 and 4) is provided which includes a plurality of solder pads 88 which correspond geometrically to a plurality of solder pads 90 located on the rectangular portion 48. The connector 86 has a series of etched conductors (not shown) on its surface which carry current from the solder pads 88 to a suitable interface element 92. Other types of suitable connectors may be used.

To provide appropriate voltage to the detector array 10, a resistor network 94 is located on the connector 86. The terminals of the resistor network 94 extend through the solder pads 88 of the connector 86 and the solder pads 90 of the rectangular portion 48, and provide electrical communication therebetween. The resistor network 94 functions as a voltage divider so that the appropriate voltages are provided to the terminals of the detector array 10 via the fineline and fatline harness assemblies 28 and 42. To electrically insulate the connections between the rectangular portion 48, the connector 86, and the resistor network 94, two insulating pads 96 and 98 are provided. The insulating pad 98 is located on the top of the resistor network 94, while the insulating pad 96 is located adjacent the surface of the rectangular portion 48 which is soldered. While the insulating pads 96 and 98 may be construed from a cellular elastomer, it is to be understood that other suitable materials may be used.

It should be understood that while this invention was described in connection with a particular example thereof, other modifications will become apparent to those skilled in the art after a study of the specification, drawings, and following claims.

What is claimed is:

1. An apparatus for cooling a device for detecting infrared radiation comprising:
   means for housing said device;
   an expander;
   means for mounting said device on the cold tip of the expander; and
   insulating means comprising polymeric foam disposed between said means for housing and said expander, said insulating means operable to allow said device to function without requiring evacuation of said means for housing.

2. The apparatus of claim 1, wherein said insulating means comprising a sleeve of insulating material adapted to allow the temperature of said device to be maintained within a predetermined range.

3. The apparatus of claim 1, wherein said apparatus further includes means for sensing the temperature of said device, said means for sensing operable to generate an electrical signal responsive to the temperature in the region of the cold tip adjacent to said device.

4. The apparatus of claim 3, wherein said means for sensing comprises at least one diode having a forward voltage which is responsive to the temperature of said diode for a predetermined bias current.

5. An apparatus for cooling a device for detecting infrared radiation comprising:
   means for housing said device;
   an expander located within said means for housing so as to provide mechanical support to said device, said expander having a cold tip upon which said device is secured, said expander operable to cool said device upon receipt and subsequent expansion of a fluid;
   means for supplying the fluid to said expander;
   means for sensing the temperature of said device, said means for sensing being responsive to the temperature of a region of said cold tip adjacent to said device, said means for sensing being operable to generate an electrical signal for use in controlling said means for supplying the fluid; and
   insulating means comprising polymeric foam disposed between said expander and said means for housing, said insulation means operable to allow said device to function without requiring evacuation of said means for housing.

6. The apparatus of claim 5, wherein said means for supplying the fluid is a compressor coupled to said expander by a transfer line.

7. The apparatus of claim 6, wherein said means for sensing comprises at least one diode in which the forward voltage across said diode for a predetermined bias current is responsive to the temperature in the region of said cold tip adjacent to said device.

8. The apparatus of claim 7, wherein said device is coupled to an electronics housing through a resistor network, said resistor network operable to provide the appropriate voltage to the terminals of said device.

9. The apparatus of claim 8, wherein:
   said resistor network is electrically coupled to said device through an etched circuit cable harness assembly.

10. The apparatus of claim 9, wherein:
    said apparatus further includes a grommet mounted on a portion of said etched circuit cable harness assembly, said grommet operable to ground radio frequency interference propagating on the surface of said etched circuit cable harness assembly which may otherwise interfere with the operation of said device.

11. The apparatus of claim 10, wherein:
    said etched circuit cable harness assembly includes a first and second portion, said first portion having at least one end segment electrically communicating with said device and coupling current therefrom to a first circular interface on said first portion, said second portion of said etched circuit cable harness assembly having at least one end segment electrically communicating with said resistor network and delivering current therefrom to a second circular interface on said second portion, said first and second circular interfaces operable to allow current to be conducted therebetween.

12. The apparatus of claim 11, wherein:
said etched circuit cable harness assembly further includes a plurality of ferrules disposed between said first and second circular interfaces to facilitate electrical conduction therebetween.

13. The apparatus of claim 12, wherein:
said apparatus further includes a lens cell for focusing infrared signals on said device, said lens cell comprising layers of germanium and zinc sulfide.

14. The apparatus of claim 13, wherein:
said apparatus further includes a coldshield means secured to said expander, said coldshield means allowing infrared radiation to reach said device while reducing heat transfer to said device.

* * * * *